United States Patent [19]

Shipman et al.

[11] 4,024,764
[45] May 24, 1977

[54] METHOD AND APPARATUS FOR MEASURING PRODUCT SURFACE TEMPERATURE IN A SPRAY COOLING CHAMBER

[75] Inventors: Johnson Shipman; Herbert L. Gilles, both of Bethlehem, Pa.

[73] Assignee: Bethlehem Steel Corporation, Bethlehem, Pa.

[22] Filed: Apr. 22, 1976

[21] Appl. No.: 679,116

[52] U.S. Cl. .............................. 73/340; 73/355 R; 164/4
[51] Int. Cl.² .......................................... G01K 1/00
[58] Field of Search .............. 73/355 R, 340, 341, 73/342, 343 R, 351; 164/4

[56] References Cited

UNITED STATES PATENTS 3,478,808  11/1969  Adams .................................. 164/4

FOREIGN PATENTS OR APPLICATIONS 822,744  11/1974  Belgium ........................... 73/355 R

*Primary Examiner*—Donald O. Woodiel

*Attorney, Agent, or Firm*—Joseph J. O'Keefe; John I. Iverson; George G. Dower

[57] ABSTRACT

Strand surface temperature is measured accurately at multiple stations in spray cooling region of a continuous metal caster where environmental conditions are severe. Each station includes a pyrometer having a light pipe with a tip aimed at the strand and provided with both air and water wash streams. Control devices, operating in response to sequence timers, periodically resets measuring circuits, interrupts each strand cooling spray and light pipe wash water stream, and turns on the air wash stream, all during a short temperature sampling period. Selection of sampling period is governed by light pipe location, pyrometer response time, and strand reheat properties when spray is off. The peak temperature measured at each station is stored as the true strand temperature for that location. Thereafter strand and light pipe cooling are restored while the air wash is interrupted. Stored temperature signals may be recorded and analyzed to define caster operating parameters and cooling practices.

20 Claims, 7 Drawing Figures

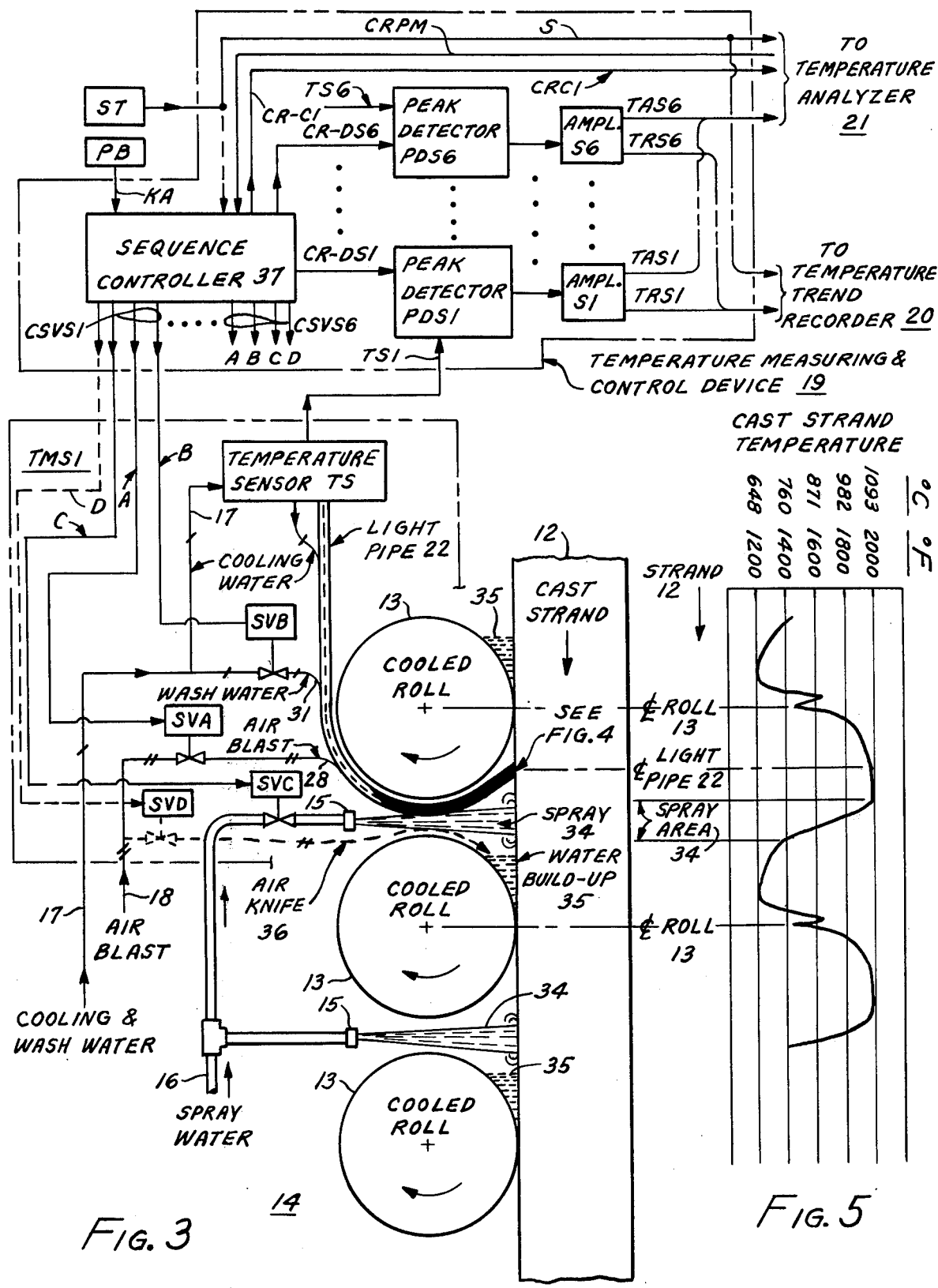

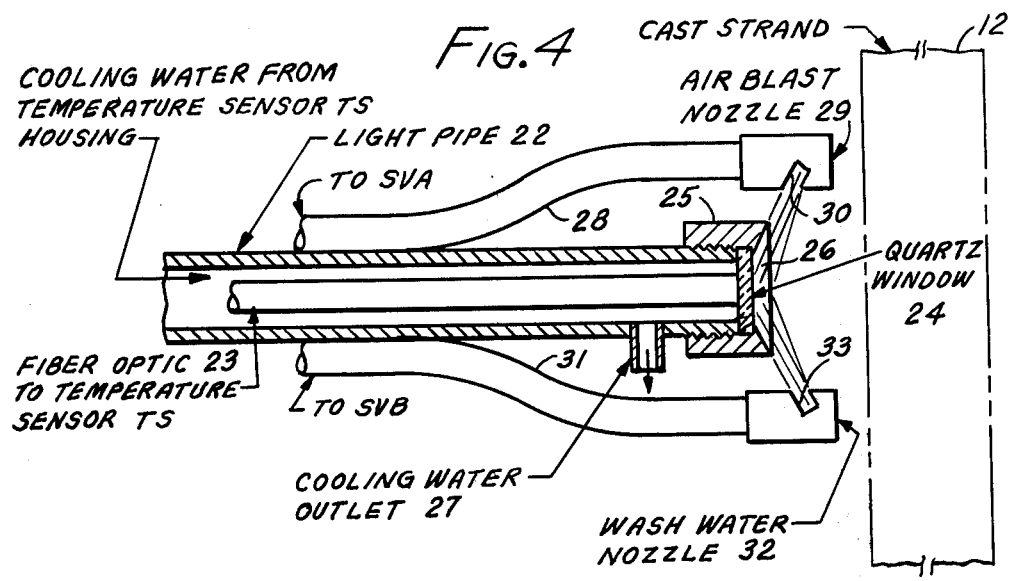
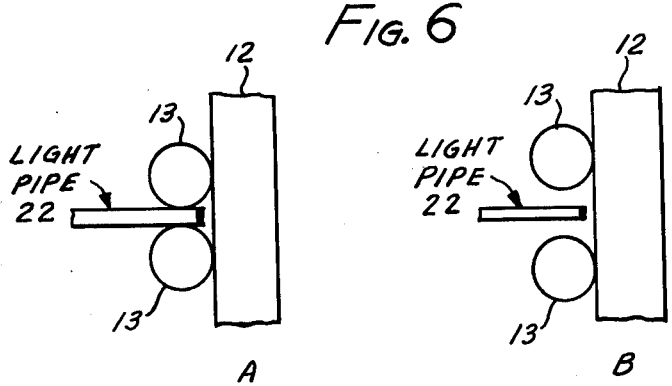

METHOD AND APPARATUS FOR MEASURING PRODUCT SURFACE TEMPERATURE IN A SPRAY COOLING CHAMBER

BACKGROUND OF THE INVENTION

1. Field of the Invention

This invention relates broadly to measuring temperatures. More particularly, this invention relates to a method and apparatus for measuring surface temperature of product moving through a spray cooling chamber. Reference will be made herein to measuring the surface temperature of strand moving through a spray cooling chamber in a continuous metal caster, but the invention may be used inside a spray chamber in other manufacturing processes.

2. Description of the Prior Art

A variety of continuous casting machines are used in the basic metals industry to continuously produce semi-finished billets, slabs and other types of strands. In each type machine, freezing of molten metal occurs in a one-step solidification process. Successful caster operation in each case involves casting strands without cracks or defects while optimizing throughput. Overall caster operation is based on a number of key parameters, one of which is secondary cooling inside a spray cooling chamber of the caster. Therefore, it is important that good control of secondary cooling be achieved in order that a hot metal skin surrounding a molten core be properly solidified and cooled in this region of the caster.

Proper control of secondary cooling in the caster can only be made by determining the degree of strand cooling occurring inside the spray cooling chamber. Most caster operators would prefer to make this determination by actually measuring strand surface temperature at several locations inside the spray cooling chamber. However, after many attempts there is still no satisfactory method and/or apparatus for measuring strand surface temperature inside the spray cooling chamber of commercially available casting machines.

On numerous occasions, conventional radiation pyrometers have been used to measure strand surface temperature inside the spray cooling chamber. The results of such trials were too inaccurate and unreliable for caster operators to use. A major reason for such poor results is the difficulty of facilitating strand surface temperature measurements under severe environmental conditions constantly present in the spray chamber during caster operation.

The severe environment in the spray chamber is caused by a combination of factors such as liquid water, water mist, steam and foreign particles in cooling water as well as from mill scale flaked away from the metal surface being spray cooled. Each of these environmental factors cause a reduction in radiant energy to the temperature sensor used in the spray cooling chamber. Consequently, this produces corresponding erratic and inaccurate slab surface temperature measurements that vary unpredictably according to the effects of any one or a combination of the environmental factors.

For example, when using a radiation pyrometer that is responsive to only a single color, the measurement error is on the low side of normal. For two-color radiation pyrometers, the measurement error is usually on the high side. The latter instance is due to unequal energy losses of the different wavelengths of radiation passing through the severe environment inside the spray cooling chamber. Known prior art attempts to overcome these measurement difficulties has been limited to three areas. First, air blasts were used to physically blow liquid water, water mist and steam out of the pyrometer sight path. Second, two-color pyrometers were used to cancel out the effect of energy losses. Third, to a limited extent, light pipes and sighting tubes were used for the purpose of minimizing the length of path where optical interference occurs. Each of these three methods have met with only partial success for various reasons.

SUMMARY OF THE INVENTION

One of the objects of this invention is to provide an improved method and apparatus for measuring strand surface temperature inside the spray cooling chamber of a continuous metal caster.

Another object of this invention is to provide an improved method and apparatus that will overcome the foregoing difficulties of measuring strand surface temperature accurately and reliably in the severe environment of a spray cooling chamber.

Still another object of this invention is to provide a method and apparatus for measuring strand surface temperature having a choice of sensor locations in a spray cooling chamber.

Yet another object of this invention is to provide a method and apparatus for measuring strand surface temperature in a spray cooling chamber which has an improved speed of response without sacrificing accuracy or reliability, thereby facilitating greater operator flexibility and improved quality of product issuing from the spray cooling chamber.

The foregoing objects are attainable by measuring strand surface temperature at multiple stations along the caster secondary cooling region and minimizing or eliminating the above-mentioned measurement problems at each station. This is achieved by (a) repetitively interrupting strand cooling spray at each station for a short-duration sampling period; (b) choosing a strand surface temperature sensor for each station having a cooled light pipe with a sensor window located at one of several strand locations which have predetermined thermal characteristics; (c) washing the sensor window with water spray between sampling periods and cleansing and drying the window with an air blast during the sampling period; (d) using air knives at stations where it is desired to cleanse the strand surface; and (e) utilizing a predetermined sensing duration associated with the sensor and window location chosen to measure the strand surface temperature measurement at each station.

Further, by providing temperature measuring control circuits for each temperature measuring station which includes an adjustable sequence timer means for (a) establishing a variable sampling period and a variable repetitive cycle for the sampling period; (b) resetting the strand surface temperature signal to a zero base prior to each sampling period; (c) detecting and storing the peak strand surface temperature sensed during the sampling period; and (d) establishing sequential control of the strand spray coolant flow, the sensor window spray water and air blast, and the air knives at each temperature measuring station.

Thus, the foregoing method and apparatus minimize or eliminate all of the above-mentioned temperature measuring problems, namely, liquid water, water mist, steam, scale and foreign particles at each measuring station along the strand cooling region. As a result, a clear and error-free sighting path is provided between the strand surface and the temperature sensors during the sampling period. This provision, together with using temperature sensors having improved sensitivity and response time, facilitate highly accurate and reliable strand surface temperature measurements at each measuring station along the strand cooling region.

BRIEF DESCRIPTION OF THE DRAWINGS

FIG. 3 is a piping and instrumentation diagram showing a typical temperature measuring station along the spray cooling region of a caster and includes a temperature measuring and control device associated with each of the measuring stations.

FIG. 4 is an enlarged cross-sectional view of the sensing end of each strand surface temperature sensor shown in the FIG. 3 embodiment.

FIG. 5 is a graph showing how the cast strand surface temperature varies with position along the caster cooling region, typically between cooled rolls in the spray cooling region of the caster.

FIG. 6 is a diagrammatic showing of different size temperature sensor ends and locations between caster rolls.

DESCRIPTION OF THE PREFERRED EMBODIMENT

Figure 1:
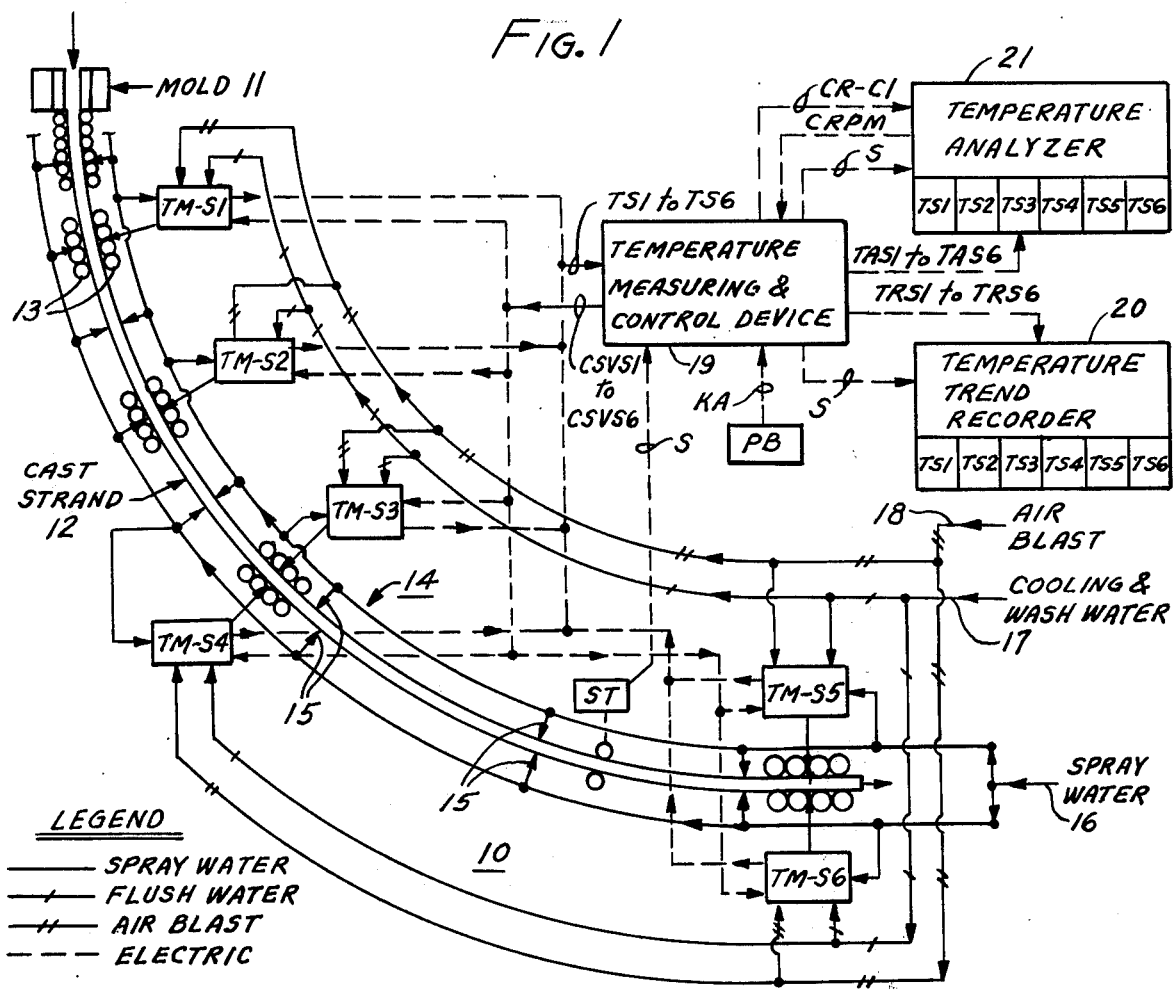
FIG. 1 is a block diagram of a continuous metal caster having multiple strand surface temperature measuring stations along a secondary cooling region in which the present invention is incorporated.

FIG. 1 shows diagrammatically a continuous metal caster 10 in which the present invention is incorporated. Caster 10 has a water-cooled mold 11 continuously receiving molten metal from a tundish (not shown). Mold 11 partially solidifies this metal into a moving cast strand 12 having a liquid core surrounded by a skin thick enough to support strand 12 within a series of upper and lower water-cooled rolls 13. Below mold 11 is spray cooling region 14 which includes a plurality of spray banks, each with spray nozzles 15, disposed above and below strand 12 all along the spray cooling region 14.

Spray nozzles 15 are connected to spray water manifold 16 which is pressurized by a source not shown to supply a sufficient amount of water to the surface of strand 12 so that strand 12 solidification process is completed in spray cooling region 14. Spray water flow is either preset by the operator of caster 10 or adjusted by him, to maintain a predetermined flow rate in relation to strand 12 surface temperature, caster speed and other factors. It should be noted that for purposes of clarity FIG. 1 does not show a conventional chamber around the spray coolant region 14, nor the usual auxiliary equipment for purging this chamber so as to remove a major portion of the severe environment in which the strand surface temperature measurement must be made.

Caster 10 is equipped with a plurality of temperature measuring stations disposed above and below moving strand 12 in spray cooling region 14. These stations are exemplified diagrammatically in FIG. 1 by the six temperature measuring stations identified as TMS1 through TMS6. The exact number and location of each temperature measuring station will depend upon two essential factors. One is the desired temperature profile of strand 12 to be measured and the other is space availability in the particular caster 10 for mounting sensors and the like. The more temperature sensors the more complete will be the resulting temperature profile of moving strand 12.

Each temperature measuring station TMS1 through TMS6, which is detailed in FIGS. 3 and 4 and described below, is adapted to produce temperature signals representative of moving strand 12 at its particular location. These temperature signals are identified by one of the TS1 through TS6 groups of signals in FIG. 1. In addition, each temperature measuring station is also adapted to receive temperature measuring control signals identified by one of the CSVS1 through CSVS6 groups of control signals. Moreover, each temperature measuring station is adapted to receive and/or interrupt (a) spray water to a spray nozzle 15 from manifold 16, (b) temperature sensor cooling and wash water from manifold 17, and (c) temperature sensor window air blast from manifold 18, all manifolds being connected to respective external sources.

Speed of the moving cast strand 12 is measured by speed transmitter ST which is driven by one of the rolls 13. Speed transmitter ST produces a speed signal S which is proportional to strand 12 speed and is used for recording, analysis and control purposes as described below.

A temperature measuring and control device 19 is adapted to receive the TS1 through TS6 temperature signals and process them internally through respective peak detectors and amplifiers as described below. Temperature output signals TRS1 through TRS6 are produced and fed to respective channels on conventional temperature trend recorder 20. Additional temperature output signals TAS1 through TAS6 are also produced which are fed to respective channels on temperature analyzer 21. Analyzer 21 may be one of a number of conventional devices such as a data logger or a computer for estimating strand temperature using temperature response during reheating of strand 12.

Strand speed signal S is received by temperature measuring and control device 19 and fed to temperature recorder 20 and temperature analyzer 21 for coordination purposes.

Temperature measuring and control device 19 also generates groups of sequential control signals CSVS1 through CSVS6 which are fed to respective temperature measuring stations TMS1 through TMS6. In addition, device 19 also generates an analyzer interrupt signal CR-C1 which is also fed to temperature analyzer 21. Device 19 operation is initiated by either local pushbutton PB through leads KA, or by a remote pushbutton in analyzer 21 through leads CRPM.

Before describing how the temperature measurments of moving strand 12 are made, it is important to understand the heat transfer phenomenon of a body whose surface temperature is to be measured. For example, when continuously casting steel the molten metal entering mold 11 is about 2790° F. (1532° C.). Upon leaving mold 11, the skin temperature of moving steel strand 12 is about 2200° F. (1204° C.), while the liquid core temperature is about 2785° F. (1529° C.). As strand 12 completes its residence time in spray cooling region 14, its solidified temperature is about 2200° F. (1204° C.). Thus, it will be apparent that a considerable amount of heat must be removed from moving steel strand 12 during a normal residence time in spray cooling region 14.

As stated above, the spray water to nozzle 15 is interrupted momentarily in the vicinity where a temperature measurement is to be made. When the spray water in region 14 is turned off locally, reheating of moving strand 12 occurs beyond the spray in the direction strand 12 is being cast. The rate of increase in strand 12 surface temperature is a function of the previous rate of cooling due to spray water from nozzle 15, as well as the length of time spray cooling was in effect. Reheating of a steel strand 12 after interrupting spray cooling is listed in TABLE 1 and shown in FIG. 2.

Table I

| Heat Flux Under Water Spray, BTU/HR-FT² | (W/m²) | Time Under Water Spray, Sec. | Time After Water Spray Is Shut Off, Sec. | Reheating of Surface, ° F. | ° C. |
|---|---|---|---|---|---|
| 25,000 | 78,812 | 4 | 0 | 0 | 0 |
| | | | .01 | 1.2 | .7 |
| | | | .1 | 3.8 | 2.1 |
| | | | 1.0 | 9.8 | 5.4 |
| | | | 2.0 | 12.4 | 6.9 |
| | | | 3.0 | 14.0 | 7.8 |
| 50,000 | 157,624 | 4 | 0 | 0 | 0 |
| | | | .01 | 2.4 | 1.3 |
| | | | .1 | 7.5 | 4.2 |
| | | | 1.0 | 19.6 | 10.9 |
| | | | 2.0 | 24.8 | 13.8 |
| | | | 3.0 | 27.9 | 15.5 |
| 500,000 | 1,576,240 | 4 | 0 | 0 | 0 |
| | | | .01 | 25 | 13.9 |
| | | | .1 | 75 | 41.7 |
| | | | 1.0 | 196 | 108.9 |
| | | | 2.0 | 248 | 137.8 |
| | | | 3.0 | 279 | 155.0 |
| 500,000 | 1,576,240 | 2 | 0 | 0 | 0 |
| | | | .01 | 24 | 13.3 |
| | | | .1 | 72 | 40.0 |
| | | | 1.0 | 175 | 97.2 |
| | | | 2.0 | 212 | 117.8 |
| | | | 3.0 | 233 | 129.4 |

Figure 2:
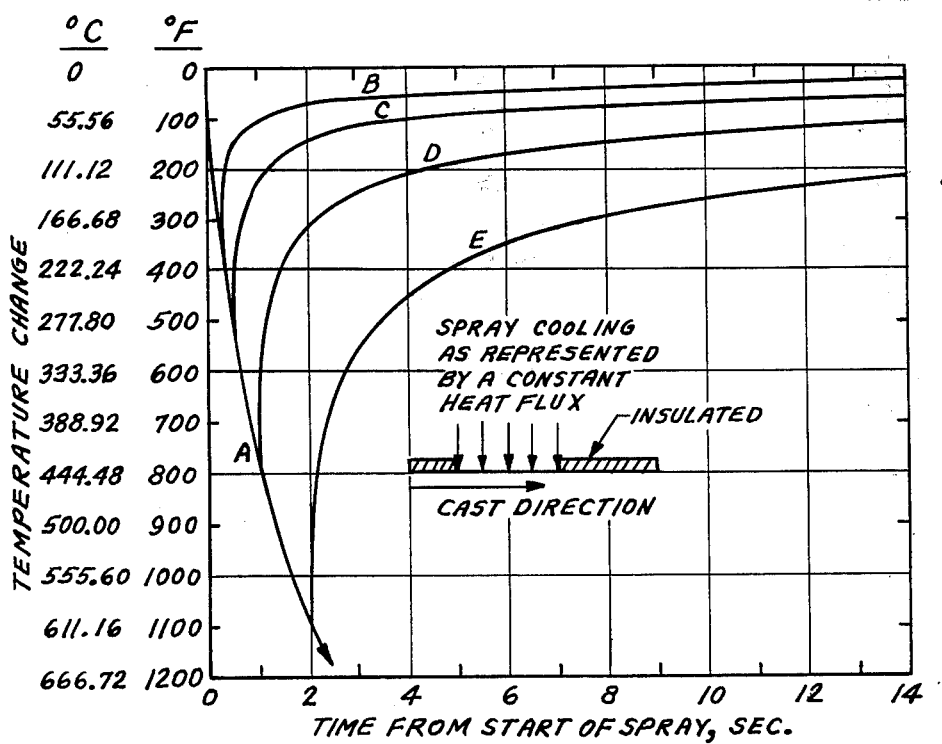
FIG. 2 is a graph showing strand surface temperature change versus time from start of applying spray coolant to the surface of a cast steel strand.

In TABLE 1 it is assumed that steel strand 12 is stationary momentarily. The actual reheating temperature rise is most predominant at the highest heat flux values. In FIG. 2, it is also assumed that steel strand 12 is stationary momentarily, but the heat flux is 1,500,000 BTU/Hr.Ft.² (4,728,721 W/m²) which is considerably higher than that in TABLE 1. Curve A in FIG. 2 represents the temperature drop of strand 12 surface under a constant heat flux for a time period of two seconds. Curves B through E represent strand reheating temperatures taken along Curve A at ¼, ½, 1 and 2 second intervals after shutting off the spray cooling supply to strand 12. As time becomes a significant factor in reheating of strand 12, a family of tabular and/or graphical data may be developed in relation to the speed signals S to complement the static data in TABLE 1 and FIG. 2.

Moreover, the greater the distance downstream from the maximum spray impact area on strand 12, the lower will be the reheat rate and the longer the time interval permitted to make the surface temperature measurement on strand 12. For example, near temperature measuring station TMS5, the heat flux due to spray water would be in the order of 25,000 to 50,000 BTU/Hr.Ft.² (78,812 to 1,576,240 W/m²) and the measuring times would be one to two seconds.

In situations as illustrated in FIG. 2 where the cooling rate of the spray is quite high, the reheat rate of strand 12 surface will also be quite rapid. However, this situation will be dealt with as explained below by using high-response temperature sensors and electronic circuits to capture and hold the strand surface temperature readings in less than 100 milliseconds. Temperature readings from such arrangements may be fed to trend recorder 20 and to data analyzer 21 for logging. Alternatively, analyzer 21 may be a computer programmed for real-time determination of strand 12 surface temperature based on repetitive computations using the temperature response of strand 12 during reheating.

Turning now to FIG. 3, a typical temperature measuring station identified as TMS1 is conveniently shown in a vertical position of caster 10 immediately below mold 11 (not shown). Cast strand 12 is shown moving downward at this point, but as it progresses through spray cooling region 14 the direction of strand 12 changes to the right as shown in FIG. 1. The moving cast strand is supported by a set of lower water-cooled rolls 13, the upper set of rolls being omitted for purposes of clarity.

Included in each temperature measuring station TMS1 through TMS6 is a water-cooled temperature sensor TS which is preferably located away from strand 12 and roll 13 but somewhere nearby in spray cooling region 14. Temperature sensor TS may be a conventional Land optical pyrometer mounted in a water cooled housing and equipped with water-cooled light pipe 22. Light pipe 22 is so contoured as to extend from the pyrometer, between two rolls 13, around one of the rolls 13 and then upward toward strand 12. The sensing end of light pipe 22 extends to within one-half to two inches of the surface of strand 12 and a typical detail thereof is shown in FIG. 4. Actually, the shortest practical distance from strand 12 will minimize radiant energy absorption effects of steam and water.

As shown in FIG. 4, light pipe 22 includes fiber optic 23 extending coaxially from the pyrometer to quartz window 24. The sensing end is terminated by quartz window 24 which is transmissive of radiant eminating from the surface of moving strand 12. Quartz window 24 is held in position and sealed from the spray region environment by threaded retaining ring 25. A beveled opening 26 in ring 25 is provided to accommodate unrestricted transmission of radiant energy emitted from the surface of strand 12.

Light pipe 22 is adapted to conduct cooling water fed from temperature sensor TS through the coaxial space surrounding fiber optic 23 and discharged through outlet 27 into spray cooling region 14. In so doing, both fiber optic 23 and quartz window 24 are protected against the extreme heat radiating from moving strand 12. In addition, the sensing end of light pipe 22 is cleansed and dried during temperature measurements by an air blast fed over conduit 28 from solenoid valve SVA to air blast nozzle 29 and through nozzle opening 30 against quartz window 24. Moreover, the sensing end of light pipe 22 is also adapted to be washed continuously, except during temperature measurements, by wash water fed over conduit 31 from solenoid valve SVB to wash water nozzle 32 and through nozzle opening 33 against quartz window 24. In this way all foreign matter in spray cooling region 14 will continuously be washed away from quartz window 24 so that a buildup will not occur and an accurate strand surface temperature measurement may be made at any time on a moments notice.

During normal casting operations, FIG. 3 shows spray water 34 being fed from manifold 16 through spray nozzles 15 and directed against the surface of moving cast strand 12. The drawing depicts a single nozzle 15 aligned between pairs of rolls 13, but in practice some casters may have rows of nozzle to effect proper cooling instead of the single nozzle shown. Regardless of nozzle arrangement, cast strand 12 is solidified while moving in the spray cooling region 14 by the combined cooling effects of the water spray 34, the water-cooled rolls 13, and spray water buildup 35 which is trapped momentarily between rolls 13 and moving cast strand 12. This combined cooling effect at temperature measuring station TMS1 normally causes considerable surface temperature variations along strand 12. These temperature variations are illustrated in the graph shown in FIG. 5.

As will be seen by referring to FIGS. 3 and 5, the greatest cooling effect occurs at the water buildup 35 above the centerline of roll 13. The least cooling effect occurs in the space between the water spray area 34 on strand 12 and the centerline of roll 13. This is the space where the least amount of reheating of strand 12 will occur when the flow of spray water 34 is interrupted momentarily. Hence, this space is the preferred location for the sensor end of light pipe 22 so that the maximum surface temperature of strand 12 may be measured after reheating occurs.

It should be noted that the elapsed time required to replace spray cooled strand 12 under the sensor end of light pipe 22 is based on three factors. The first factor is attributed to the reheating properties of strand 12 as disclosed in TABLE 1 and FIG. 2. The second factor is based on response characteristics of the pyrometer in temperature sensor TS and the viewing area of strand 12 by the light pipe 22 when coupled to the pyrometer. The third factor is based on the speed of cast strand 12 moving past light pipe 22. Remember that casting speed is represented by the speed signal S described above.

In one installation for casting steel where reheat properties were selected as noted above, the Land pyrometer in TS and light pipe 22 coupled thereto had conventional response characteristics, the sensor end of light pipe 22 was at the preferred location in FIG. 3, and the casting speed was within a normal range, it took about two to five seconds elapsed time for spray cooled material in strand 12 to move away from light pipe 22 and be replaced with reheated material from the spray above.

If the casting speed range is expected to be less than the normal range, or if a greater measurement sensitivity is required, the light pipe 22 may be enlarged diammetrically and centered between pairs of rolls 13 as shown in FIG. 6A. Under this configuration it will take ten to fifteen seconds elapsed time for the spray cooled material in strand 12 to be replaced with reheated material.

If the casting speed range is expected to be greater than the normal range, then the response of the temperature sensor TS and accompanying electronics described above must be rapid enough to capture the onset of reheating rather than the maximum reheating temperature noted above for the normal and sub-normal speed ranges of caster 10 operation. This is accomplished by substituting a Land silicon cell having, for example, a 10 msec. response time and using corresponding electronics for the normal Land cell electronics. In addition, the light pipe 22 may be decreased diammetrically and located between pairs of rolls 13 as shown in FIG. 6B. This arrangement permits extremely short measuring intervals, in the order of 100 msec., and permits small viewing areas of strand 12 surface by light pipe 22 in order to make high speed surface temperature measurements. In some instances where casting speed range is high it may be necessary to coordinate temperature measurement elapsed time with the speed of moving cast strand 12.

Returning to FIG. 3, temperature measuring station TMS1 includes three solenoid control valves as follows. Their sequence of operation is described below. Normally closed solenoid valve SVA when energized starts the flow of air blast between manifold 18 and nozzle 29 at the sensing end of light pipe 22 shown in FIG. 4. Normally open solenoid valve SVB when energized stops the flow of wash water between manifold 17 and nozzle 33 at the sensor end of light pipe 22. Manifold 17 continuously supplies cooling water for temperature sensor TS and light pipe 22, the latter discharging from outlet 27. Both nozzle 33 and discharge outlet 27 are also shown in FIG. 4. Normally open solenoid valve SVC when energized stops the flow of spray cooling water between manifold 16 and one or a bank of spray nozzles 15. Only the nozzle(s) adjacent light pipe 22 are to be controlled by SVC during a strand temperature measuring interval. The remaining nozzles 15 between temperature measuring stations are connected to manifold 16 for continuous flow of spray coolant during casting operations.

Where the temperature measuring station is located at a portion of spray cooling region 14 where cast strand 12 is about 30° from horizontal or less, such as TMS5 shown in FIG. 1, spray water may collect in a pool on the top surface of moving strand 12. A conventional air knife 36 shown by dotted lines in FIG. 3 is employed to clear the surface of the pool of water. Normally closed solenoid valve SVD when energized slightly before SVC and deenergized at the same time as SVC will control the air flow between manifold 18 and air knife 36. This will remove the spray water pooled on the surface of strand 12 at the proper time to make a satisfactory surface temperature measurement of moving strand 12. An air knife 36 may be employed at any temperature measuring station where it is desired to rapidly clear spray water buildup 35 from between strand 12 and rolls 13 prior to making a strand surface temperature measurement.

Still referring to FIG. 3, each of the solenoid valves SVA, SVB, SVC and SVD when used, are energized in a timed sequence by respective control leads A, B, C shown solid and D shown dotted, which leads are contained in group CSVS1 fed from the temperature measurement and control device 19. Each of the other temperature measuring stations TMS2 through TMS6 have corresponding A, B, C and D leads contained in groups CSVS2 through CSVS6 which are also fed from device 19.

In regards to whatever strand surface temperature is sensed at the sensor end of the light pipe 22 in each temperature measuring station TMS1 through TMS6, separate proportional output signals TS1 through TS6 are continuously fed to respective peak detectors PDS1 through PDS6 in temperature measuring and control device 19. The peak detectors are conventional Land pyrometer electronic devices which continuously sample the instantaneous TS signal and store the peak signal representing strand 12 surface temperature. The peak detectors PDS1 through PDS6 each maintain a constant peak level output signal until reset simultaneously just prior to interrupting spray water flow by reset signals CR-DS1 through CR-DS6. Peak detector output signals are fed to respective differential grounded amplifiers Ampl. S1 through Ampl. S6 which provide output signals to two separate load sources.

One amplifier load source is the multi-pen trend recorder 20 where the surface temperature signals TRS1 through TRS6 from associated temperature measuring stations TMS1 through TMS6 are recorded for comparison with a predetermined temperature profile of moving cast strand 12. Deviations from the temperature profile are an accurate and reliable indication to the operator of caster 10 of what strand cooling means must be adjusted to standardize the solidification process of cast strand 12.

The other amplifier load source is the temperature analyzer 21 where the surface temperature signals TAS1 through TAS6 from associated temperature measuring stations TMS1 through TMS6 are recorded by a data logger for after-the-cast analysis, or are utilized by a computer as explained below.

Figure 7:
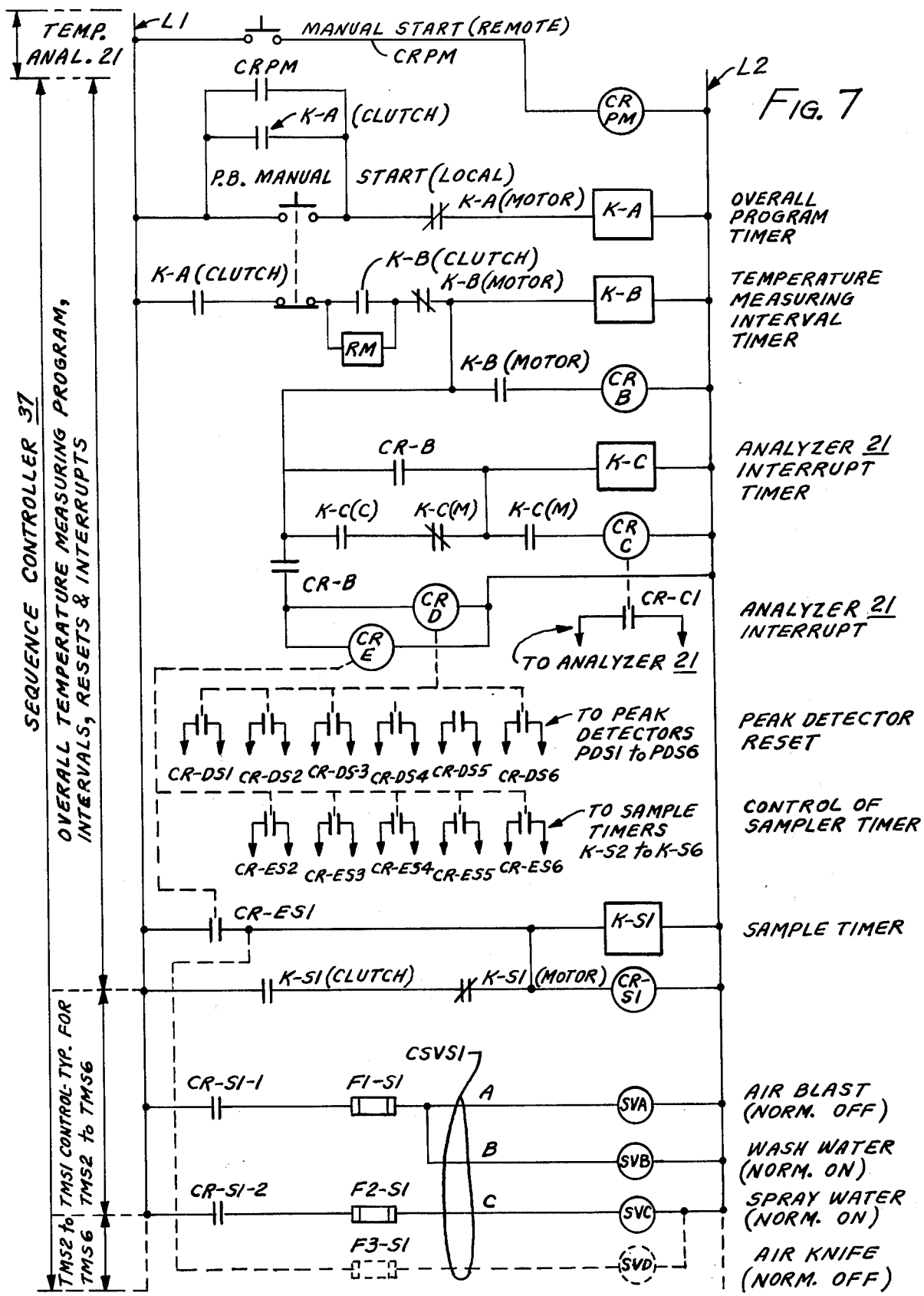
FIG. 7 is a schematic diagram of the sequence timer used to generate the sampling period control, the detector reset control and a typical solenoid control of fluids at a temperature measuring station, all associated with the control device referred to in FIG. 3.

Sequence controller 37, which is diagrammed in FIG. 7, is included in device 19 to provide groups of solenoid valve control signals CSVS1 through CSVS6 in timed sequences, and peak detector reset signals CR-DS1 through CR-DS6 simultaneously before the cooling spray water is interrupted momentarily at each temperature measuring station. Sequence controller 37 is initiated for a given program duration by local pushbutton station PB acting through leads KA, or alternatively, by remote control from temperature analyzer 21 through leads CRPM. Controller 37 also provides an interrupt control signal over leads CR-CI to temperature analyzer 21.

The caster speed signal S is fed from speed transmitter ST through device 19 to both temperature recorder 20 and temperature analyzer 21 to correlate strand surface temperature with caster speed. Alternatively, the speed signal S may be fed to sequence controller 37 to vary the temperature measuring interval as a predetermined function of caster speed.

Reference will now be made to FIG. 7 which shows a schematic diagram of sequence controller 37. There are several timing sequence functions performed by sequence controller 37 which are initiated by either local push-button PB through circuit KA, or by a remote pushbutton in temperature analyzer 21 through circuit CRPM. Generally, the timing functions are performed by Eagle Signal Co. electro-mechanical adjustable timers of the HP series, each of which have a timer motor (M) and a clutch (C) wired in parallel externally (not shown), and in one instance, a reset module (RM) for automatically recycling the timer operation.

An overall program timer KA, model HP-57 having a timing range of up to two hours, is started when PB is closed and continues to run for its preset duration. When timer KA is first energized, the contacts KA(C) close and remain closed only for the preset duration. Contact KA(M) opens momentarily and deenergizes the KA motor at the end of the present duration. Timer KA controls all other timing functions described below and may have its preset duration comparable to say the duration of a single cast made in caster 10. The KA duration may start when a "start cast" pushbutton is pressed and may continue for a greater or lesser time as desired. In fact, time KA may be eliminated entirely if the normal casting operation is uninterrupted and the operator desires to have temperature recordings on a continuous basis.

A temperature measuring interval timer KB, a model HP-53 having a timing range of from nine seconds to five minutes, and a momentary contact operation of from 1.5 to 4.5 seconds and a reset module RM, is started when contact KA(C) closes and continues to run for the preset duration, then automatically resets itself as long as contact KA(C) is closed. Timer KB initiates the surface temperature measurements and establishes the sampling interval within which these measurements are made. Control relay CRB operates concurrently with the momentary closure of contact KB(M) as do control relays CRD and CRE which become energized momentarily at the beginning of the sampling period.

When relay CRD is energized momentarily, contacts CR-DS1 through CR-DS6 also close momentarily. These contact closures reset the peak detectors PDS1 through PDS6 in temperature measuring and control device 19 from their various stored peak temperature values to a common base line temperature value at the beginning of each sampling period. When relay CRE is energized momentarily, contacts CR-ES1 through CR-ES6 close momentarily to simultaneously energize temperature sampling timers KS1 through KS6. These timers control the flow of air, wash and spray water at corresponding temperature measuring stations as described below.

An analyzer interrupt timer KC, a model HP-53 having the same characteristics as the KB timer and devoid of the RM feature, starts when relay contact CRB closes momentarily. Timer KB continues to run by means of the KC(C) and KC(M) contact bypass circuit which is broken when motor contact KC(M) opens momentarily at the end of the timer's preset duration. Control relay CRC operates in parallel with timer KC to provide a momentary interrupt signal over leads CR-CI to the data logger or computer in temperature analyzer 21.

Each of the temperature measuring stations TMS1 through TMS6 is provided with a corresponding sample timer KS1 through KS6. Each of these timers is a model HP-514 having a timing range of from ½ to 15 seconds for contact closure. This arrangement provides a separate adjustable temperature sampling time interval for each temperature measuring station. Therefore, each station may accommodate a different set of sensor position and response characteristics and strand reheating properties, a requirement that often occurs in practice. Each timer KS1 through KS6 is energized simultaneously, but momentarily, by the momentarily closure of respective CR-ES1 through CR-ES6 relay contacts. Clutch contacts KS1 (C) through KS6(C) close and, by means of motor contacts KS1(M) through KS6(M), maintain operation of their corresponding timers KS1 through KS6 until their respective motor contacts open after whatever duration their sampling interval was preset for.

Control relays CRS1 through CRS6 operate in parallel with sample timers KS1 through KS6, respectively. These relays provide the groups of A, B and C control signals in CSVS1 through CSVS6 to their respective solenoid valves in the temperature measuring stations as noted above. Relay contacts CRS1-1 through CRS6-1 close and energize respective solenoid valves SVA and SVB by way of fuses F1S1 through F1S6, thereby turning on the air blasts and turning off the wash water supplies for the quartz window 24 in the sensor end of light pipe 22. Relay contacts CRS1-2 through CRS6-2 close and energize respective solenoid valves SVC by way of fuses F2S1 through F2S6, thereby turning off the spray cooling water at each temperature measuring station. While the spray cooling water is off and strand 12 reheats locally, each of the temperature sensors TS output starts to rise. The peaks of their respective temperature signals are detected and stored in their corresponding peak detectors and used as described above. When each sample timer KS1 through KS6 times out after its individual preset duration, relays CRS1 through CRS6 become deenergized, which in turn deenergize respective solenoid valves A, B and C in each temperature measuring station. This removes the air blast and restores the wash water for each quartz window 24, and the cooling spray water 34 is restored for cooling cast strand 12.

When an air knife is used to wipe pools of water from the surface of moving strand 12 solenoid valves SVD are installed. These solenoid valves are energized by closure of relay contacts CRES1 through CRES6 and remain energized as long as respective relays CRS1 through CRS6 are energized. This time period starts at the onset of peak detector reset and terminates when the individual sampling time period expires for its respective temperature measuring station.

We claim:

1. A method of measuring the surface temperature of a hot product while spray cooling the product in a spray region, which method comprises:
   a. sensing the surface temperature of said product at a predetermined location in the spray region,
   b. establishing a temperature sampling interval,
   c. interrupting the product spray cooling momentarily at the temperature sensing location during the sampling interval,
   d. detecting and storing the peak surface temperature sensed during the sampling period, and
   e. restoring the product spray cooling at the end of the sampling interval.

2. The method of claim 1 wherein the sampling interval in step (b) is established in relation to product reheating properties after the spray cooling is interrupted.

3. The method of claim 1 wherein the hot product is moving and the sampling interval in step (b) is established in relation to product speed.

4. The method of claim 1 further including the step of:
   f. resetting the stored peak surface temperature at the beginning of a subsequent sampling interval.

5. The method of claim 1 further including the step of:
   g. utilizing the stored peak surface temperature signal to determine if the hot product is being cooled properly.

6. The method of claim 5 wherein the utilization in step (g) includes analyzing the stored peak surface temperature signal in relation to known product reheating properties after the spray cooling is interrupted.

7. The method of claim 5 wherein the hot product is moving and the utilization in step (g) includes analyzing the stored peak surface temperature sensed in relation to product speed.

8. A method of measuring the surface temperature of a hot product while spray cooling the product in a spray region, which method comprises:
   a. sensing the surface temperature of said product using a light pipe having a sensor end at a predetermined location in the spray region,
   b. washing the light pipe sensor end during product spray cooling,
   c. establishing a temperature sampling interval,
   d. interrupting the product spray cooling momentarily at the temperature sensing location during the sampling interval while
   e. simultaneously interrupting washing the light pipe sensor end and substituting drying thereof during the sampling period,
   f. detecting and storing the peak surface temperature sensed by the light pipe during the sampling period, and
   g. restoring the product spray cooling and sensor end washing while interrupting the sensor end drying, all at the end of the sampling interval.

9. A method of measuring the surface temperature of a hot product while spray cooling the product in a spray region, which method comprises:
   a. sensing the surface temperature of said product at a plurality of predetermined locations in the spray region,
   b. establishing one or more temperature sampling intervals each of which are related to a different sensing location,
   c. interrupting the product spray cooling momentarily at each temperature sensing location during the sampling period associated with the respective sensing location,
   d. detecting and storing each peak surface temperature sensed during its respective sampling period, and
   e. restoring the product spray cooling at the end of the respective sampling interval.

10. The method of claim 9 wherein the sampling interval in step (b) is different for one or more of the sensing locations than the other locations.

11. Apparatus for measuring the surface temperature of a hot product while spray cooling the product in a spray region, comprising:
   a. sensing means for producing a surface temperature signal of the product at a predetermined location in the spray region,
   b. timing means for generating a first control signal during a temperature sampling interval,
   c. means responsive to the first control signal for interrupting the product spray cooling momentarily at the temperature sensing location only during the sampling interval, and
   d. means for detecting and storing the peak surface temperature signal occurring during the sampling interval.

12. The apparatus of claim 11 wherein the sampling interval in timing means is established in relation to product reheating properties after the spray cooling is interrupted.

13. The apparatus of claim 11 wherein the hot product is moving and the sampling interval in the timing means is established in relation to product speed.

14. The apparatus of claim 11 wherein the timing means is adapted to generate a second control signal for resetting the detecting and storing means at the beginning of a subsequent sampling interval.

15. The apparatus of claim 11 further including:
   e. means for utilizing the stored peak surface temperature signal to determine if the hot product is being cooled properly.

16. The apparatus of claim 15 wherein the utilization means includes means for analyzing the stored peak surface temperature signal in relation to known reheating properties after the spray cooling is interrupted.

17. The apparatus of claim 15 wherein the hot product is moving and the utilization means includes means for analyzing the stored peak surface temperature signal in relation to a product speed signal.

18. Apparatus for measuring the surface temperature of a hot product while spray cooling the product in a spray region, comprising:
   a. sensing means having a light pipe with a sensing end for producing a surface temperature signal of the product at a predetermined location in the spray region,
   b. timing means for generating first, second and third control signals during a temperature sampling interval,
   c. means responsive to he first control signal for washing the light pipe sensing end before and after the sampling interval,
   d. means responsive to the second control signal for drying the light pipe sensing end during the sampling interval,
   e. means responsive to the third control signal for interrupting the product spray cooling momentarily at the temperature sensing location only during the sampling interval, and
   f. means of detecting and storing the peak surface temperature signal occurring during the sampling interval.

19. Apparatus for measuring the surface temperature of a hot product while spray cooling the product in a spray region, comprising:
   a. plural sensing means for producing separate surface temperature signals of the product at a corresponding plurality of predetermined locations in the sensing region,
   b. timing means for producing a corresponding plurality of first control signals during a temperature sampling interval,
   c. plural means each responsive to a corresponding first control signal for interrupting the product spray cooling at respective temperature sensing locations only during the sampling interval, and
   d. plural means for separately detecting and storing the peak of each surface temperature signal occurring during the sampling period.

20. The apparatus of claim 19 wherein the timing means is adapted to generate the first control signals during one or more sampling intervals.

* * * * *